United States Patent [19]

Boella et al.

[11] Patent Number: 4,605,887
[45] Date of Patent: Aug. 12, 1986

[54] ARRANGEMENT FOR CONTROLLING THE SPEED AND POSITIONING OF AN ELECTRIC MOTOR

[75] Inventors: Marcello Boella, Loranzé Alto; Ferruccio Mariotti, Banchette, both of Italy

[73] Assignee: Ing. C. Olivetti & C., S.p.A., Ivrea, Italy

[21] Appl. No.: 528,655

[22] Filed: Sep. 1, 1983

[30] Foreign Application Priority Data

Sep. 1, 1982 [IT] Italy .............................. 68062 A/82

[51] Int. Cl.$^4$ ............................................. G05B 11/18
[52] U.S. Cl. .................................... 318/594; 318/432; 318/567
[58] Field of Search ............... 318/592, 593, 594, 432, 318/433, 434, 567

[56] References Cited

U.S. PATENT DOCUMENTS

| | | | |
|---|---|---|---|
| 3,621,216 | 11/1971 | Wortzman | 318/593 X |
| 3,719,879 | 3/1973 | Marcy | 318/593 |
| 3,983,467 | 9/1976 | Bossons et al. | 318/593 |
| 4,280,182 | 7/1981 | Mickowski | 318/567 X |
| 4,312,033 | 1/1982 | Sweeney et al. | 318/594 X |
| 4,322,669 | 3/1982 | Fukuma et al. | 318/432 X |
| 4,338,556 | 7/1982 | Hetzel | 318/434 |
| 4,366,424 | 12/1982 | McKechnie | 318/592 X |
| 4,412,163 | 10/1983 | Angersbach | 318/567 |

Primary Examiner—B. Dobeck
Attorney, Agent, or Firm—Banner, Birch, McKie & Beckett

[57] ABSTRACT

A direct-current electric motor (29) used for, for example, positioning a printing device in an office machine, is controlled by an arrangement comprising a microprocessor (40) which causes the motor digitally to perform accelerations and/or decelerations to maintain it close to a desired speed programmed in relation to the distance to be completed. Control between the actual speed of the motor and the desired speed is effected utilizing the timing signals (FTA, STB) generated by a transducer (35) connected to the motor. During a first phase, the microprocessor compares the times taken to complete a series of angular steps of rotation, the steps following a schedule of decreasing size with stored reference times and effects accelerations and decelerations of durations proportional to any discrepancies. Once the motor is near enough to its target position to be on a monotonic segment of one of the timing signals (FTA) which is sinusoidal, control switches to a position feedback loop bringing the motor to a standstill with FTA zero.

15 Claims, 14 Drawing Figures

ARRANGEMENT FOR CONTROLLING THE SPEED AND POSITIONING OF AN ELECTRIC MOTOR

The present invention relates to an arrangement for controlling the speed and positioning of a direct-current motor, used for example to position members of an office machine. A typical application of the arrangement according to the invention is to the motor controlling the carriage, the printing head or the platen of an electronic typewriter.

An arrangement for controlling a direct-current motor is known wherein a microprocessor is used for generating logical signals which drive a control circuit for the motor. The logical signals are such as to accelerate the motor in either sense, in order to maintain the speed of rotation thereof always close to a predetermined theoretical speed stored in a read-only memory of the microprocessors. Depending upon the sense of rotation of the motor, acceleration in the sense will speed up the motor while acceleration in the other sense will actually decelerate the motor, referred to herein also as braking the motor.

The actual speed of the motor is detected by means of a transducer connected to the shaft of the motor and is compared with the theoretical speed. A signal indicating the difference between the two speeds is sent to a second read-only memory of the microprocessor in which are stored the acceleration and deceleration values which the motor must employ to bring itself towards the theoretical speed. This control arrangement is rather complicated, because with every value of the difference between the theoretical speed and the actual speed there is associated a different acceleration or deceleration value. Moreover, in this way the motor is not only subjected to continuous variations of state which are necessary for driving it, but is also subjected to forcing accelerations of variable degree.

The object of the present invention is to provide an arrangement for controlling a direct-current motor which is simple and at the same time very reliable and which operates in such manner that the motor is not continuously subjected to variations of acceleration or deceleration values.

In accordance with this object, the arrangement according to the invention comprises means for generating electric signals indicating the angular position of the motor and the actual time of covering a predetermined angular step, an electric control circuit adapted selectively to short-circuit and accelerate the motor in either sense, and a microprocessor connected to the control circuit and to the angular-position signal generator, characterised in that the microprocessor stores the theoretical times for covering each angular step as a function of the full amplitude of the rotation that the motor must effect and the microprocessor is arranged to compare the actual times with the theoretical times for covering each step to determine in what stage the control circuit must keep the motor and the duration of each state.

The invention will be described in more detail, by way of example, with reference to the accompanying drawings, in which.

Figure 1:
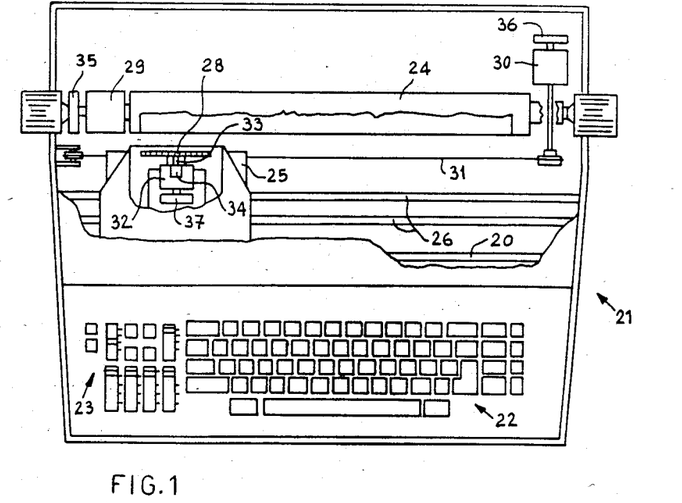
FIG. 1 is a diagrammatic plan view of a typewriter using an arrangement according to the invention.

Referring to FIG. 1, an arrangement 20 according to the invention is mounted on a typewriter 21 which comprises a keyboard 22, a command console 23, a platen 24, a carriage 25 slidable on guides 26 parallel to the platen 24, and a type daisy wheel 28, for example as described in the Applicants' Italian Pat. No. 1.016.590.

A first direct-current electric motor 29 is mounted coaxial with the platen 24 and effects the rotation thereof. A second direct-current electric motor 30 effects the shifting of the carriage 25 in front of the platen 24 through the medium of a wire cable 31, to define in this way the various printing positions along a printing line. A third electric motor 32, which is also of direct type, is mounted on the carriage 25 and effects the rotation of the type wheel 28 to position the selected character in the striking position. A printing hammer 33, which is also mounted on the carriage 25, is controlled by an electromagnet 34 to bring the selected character against the platen 24.

Three optical transducers 35, 36 and 37 are connected to the shafts of the motors 29, 30 and 32, respectively, to generate in known manner timing signals. The optical transducers 35, 36 and 37 may be, for example, of the type described in British Patent Publication GB No. 2 062 220 and are therefore not described in detail.

Figure 2:
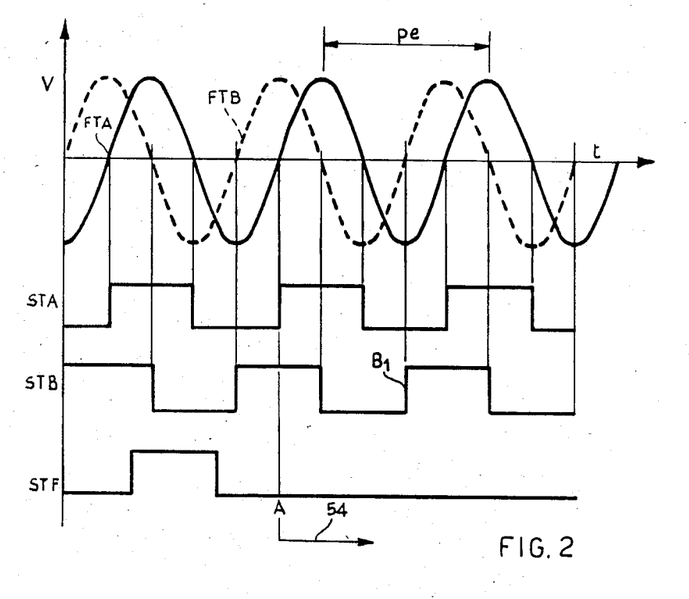
FIG. 2 is a diagram representing the waveforms of a number of electric signals of an arrangement according to the invention.

For a better understanding of the arrangement 20, there are, however, shown in FIG. 2 the analog signals FTA and FTB generated by each transducer 35, 36 and 37 during the rotation of the respective motors 29, 30 and 32, and the logical signals STA and STB derived by squaring the analog signals FTA and FTB. Moreover, once during each revolution of the motors 29, 30 and 32, the transducers 35, 36 and 37 also generate a logical synchronizing signal STF.

The arrangement 20 according to the invention is adapted to control the three motors 29, 30 and 32, but for brevity and simplicity it will now be described in detail with reference to a single one of the motors and its transducer.

The arrangment 20 (FIG. 3) comprises a microprocessor 40 of known type, for example of Intel 8641, whose functions, which will be better specified hereinafter, are to control the elements connected to it and in particular a control circuit 41 which, through the medium of a power circuit or driver 42, directly controls the motor 29 (30, 32). The transducers 35 (36, 37) associated with the motor to be controlled is connected to the microprocessor 40 and to the control circuit 41.

Figure 3:
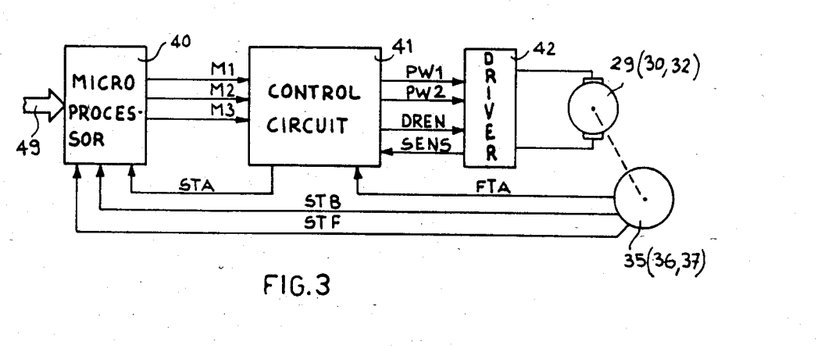
FIG. 3 is a block diagram of an arrangement embodying the invention.

The useful signals which are taken from the transducer 35 (36, 37) are the analog signal FTA and the logical signals STB and STF. The logical signal STA is formed by the control circuit 41. It is obvious that this choice is not essential for the purposes of control of the motor according to the present invention and that other methods of generating logical and analog signals relating to the rotation of the motor may be used.

In any event, however, it is important that the analog signal FTA be correlated directly with the angle by which the rotor of the motor which it is desired to control rotates. The period pe of the signal FTA (FIG. 2) corresponds to an angle of rotation of the rotor given by 360° divided by the number of obturating elements which are angularly spaced around the disc of the transducer. This angle is called the incremental angle, or simple the increment.

Figure 4:
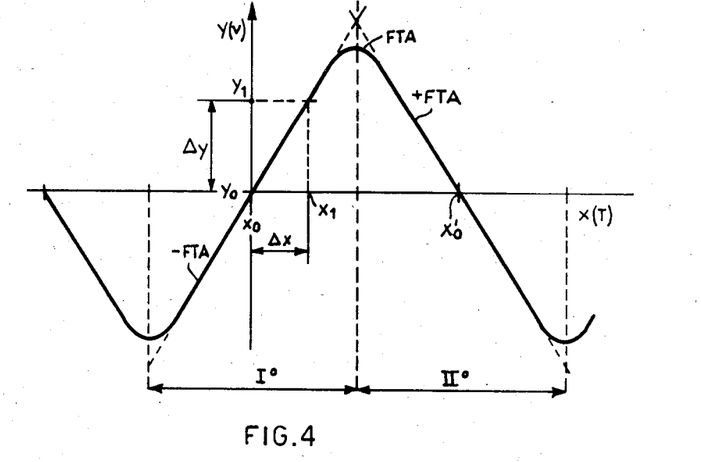
FIG. 4 is a detail of a signal of FIG. 2.

Moreover, the analog signal FTA is of sinusoidal type and, in the zones of monotony, that is where it is always increasing or always decreasing with increase in the angle of rotation, it can be regarded as a true and proper error signal with respect to any considered reference position. In other words, if the reference is the position $X_o$ in FIG. 4, to which there corresponds the level $Y_o$ of the signal FTA, for any other level $Y_1$, to which there corresponds the position $X_1$, the difference $\Delta Y = Y_1 - Y_o$ is to be regarded as a singal correlated directly with the position error $\Delta X = X_1 - X_o$. Thus, the greater the position error $\Delta X$, the greater is the value of the signal FTA.

For each period pe there are first and second zones of monotony I° and II° and as many reference points ($X_o$ and $X'_o$ in FIG. 4) where the signal FTA is at zero value. For convenience, we will call the signal FTA to which the reference position $X_o$ corresponds $-FTA$, and the same signal FTA in its second zone of monotony to which the reference position $X'_o$ corresponds we will call $+FTA$.

We have seen that the analog signal FTA is handled by the control circuit 41 (FIG. 3), while the logical signals STA, STB and STF are processed by the microprocessor 40. The latter is programmed in such manner as to give as output three logical signals M1, M2 and M3, which are directed to the control circuit 41 to produce well-defined states of the motor, as well as better described further on, in accordance with a certain program stored in the microprocessor, as a function of the value of the angle by which the motor must rotate, that is as a function of the number N of increments which separate the current position of the rotor of the motor from the position to be reached, called the target. The microprocessor 40 controls the rotation of the motor digitally until it is brought into the vicinity of the target, after which precise positioning takes place by exploiting the analog signal FTA in its zone of monotony. Before describing the functions of the microprocessor 40 in detail, it should be noted that the elementary step pa that the microprocessor utilizes as a reference parameter for its counts is not always constant and does not always correspond to a predetermned rotation of the rotor of the motor.

In the design stages, the value which this step assumes in each adjustment segment is also established. An adjustment segment is one of the sections into which the distance between the current position and the target to be reached is divided. The number of segments will be indicated by the reference M. Determination of the value of the step pa for each segment involves a compromise between two contradictory requirements:

(a) the smaller the step (and therefore the corresponding ideal time to cover the step), the finer is the control;

(b) the time for covering the step must be large enough to allow the execution of the calculations necessary in the microprocessor for control.

Figure 5:
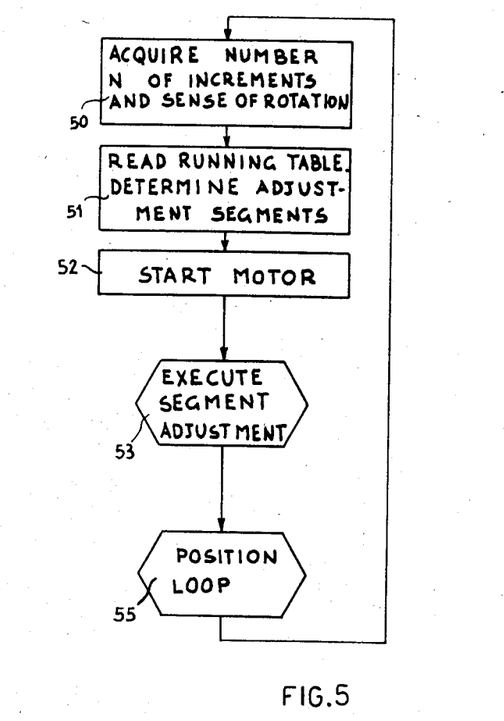
FIG. 5 is a first flowchart of the program of the microprocessor used by the arrangement embodying the invention.

We go on to describe the functions of the microprocessor 40, which can be represented diagrammatically, in broad outline, in accordance with the flowchart of FIG. 5.

In a first phase 50 there is acquisition of the sense of rotation and of the number N of increments to be gone through starting from the current position of the rotor. This information is acquired by the microprocessor through an input channel 49 (FIG. 3), from the keyboard 22 of the machine 21 (FIG. 1), or by means of conversation with another processing unit of the machine, known per se and not shown in the drawings.

In a second phase 51 (FIG. 5), there is determination, on the basis of a predetermined running table stored in the microprocessor, of the adjustment segments to be employed to go from the current position to the target. An example of a running table is illustrated diagrammatically in FIG. 6, where the ordinate $T_R$ indicates the value of the reference time, or ideal time, that the motor needs to rotate by one step pa and so maintain a predetermined speed. To determine the reference time $T_R$ to be used, the microprocessor 40 truncates the function, established at the design stage, at a suitable abscissa, namely the abscissa N, where N is the datum acquired in the stage 50.

Let is be supposed, by way of example, that four reference times $T_1$ to $T_4$ have been established and that, moreover, adjustment at $T_4$ and $T_3$ takes place with a step pa equal to one increment (pa=pe), adjustment at $T_2$ with a step equal to half an increment (pa=½pe), and finally adjustment at $T_1$ with a step equal to one quarter of an increment (pa=¼pe).

We will thus have the following summary table:

|  | $T_R$ | step (pa) |
|---|---|---|
| for $N_4 \leq N$ | $T_4$ | 1 increment |
| for $N_3 \leq N < N_4$ | $T_3$ | 1 increment |
| for $N_2 \leq N < N_3$ | $T_2$ | ½ increment |
| for $N_1 \leq N < N_2$ | $T_1$ | ¼ increment |

The values $N_1$ to $N_4$ and $T_1$ to $T_4$ are determined at the design stage and stored in a look-up table.

The microprocessor 40 is thus able to establish, for each value of N entered, the various adjustment segments M and, for each of them, both the reference time $T_R$ and the length of the step pa. For each adjustment segment, the microprocessor 40 must therefore be able to effect recognition of the step selected. This is achieved, for example, by means of suitable specific routines which, since they are not essential for the purpose of understanding the present invention, are not described for the sake of brevity.

In addition to the reference time $T_R$, the microprocessor 40 also takes into consideration a threshold time $T_S$, below which the time to cover a step pa must not fall, that is, it is required that the speed of rotation needed to cover a step pa should not be greater than a predetermined limit speed, having regard to the characteristics of the motor.

In this phase 51 of the program, the microprocessor 40 is therefore able to associate, with each N entered, the sequence of parameters to be effected and, for each segment: the number of steps, which we will call PAS, which constitute the adjustment segment; the length of the step pa established in this segment; the value $T_R$ and a proportionality constant $h_R$ therefore; the value $T_S$ and a proportionality constant $h_S$ thereof.

In the phase 52, starting of the motor takes place. As will be described in detail hereinafter, in the inoperative condition, with the motor at a standstill in a position of equilibrium, corresponding to the edge of one of the signals STA or STB, for example in the position A (FIG. 2), the microprocessor 40 is in a "position loop" state. With the passage from the phase 51 (FIG. 5) to the phase 52, the microprocessor 40 accelerates the motor in the determined running direction, for example that of the arrow 54 in FIG. 2, as far as a leading edge $B_1$ of the signal STB corresponding to a peak of the analog signal FTA. The microprocessor 40, which, as will be seen hereinafter, also calculates from time to time the effective or actual time $T_p$ of covering the step in progress, determines in this stage the value of a fictitious time $T_{po}$ for covering the first step (from the position A to the edge $B_1$ of the signal STB).

This is to take account of the unavoidable initial time of delay extending from the start command of the microprocessor to the actual instant of starting of the motor, which delay may be of some milliseconds and could jeopardize the result of the calculations which are subsequently made using the actual value of the covering time.

The phase 53 (FIG. 5) is that during which the microprocessor 40, generating logical signals M1, M2 and M3, effects the digital driving proper of the motor 29 until it brings it into the vicinity of the target. This logical phase is represented in detail in the diagram of FIG. 7. More particularly, the phase 53 comprises a first subphase 101 in which there is possible updating of the variables $T_R, h_R, T_S$ and $h_S$ in accordance with the chart of FIG. 6, of the value of PAS, which as has been seen is the number of steps to be effected in the segment considered, and of the value of the effective time $T_p$, which value is given by the sum of the times necessary to perform a series of elementary operations which cause the motor to cover one step pa.

Figure 7:
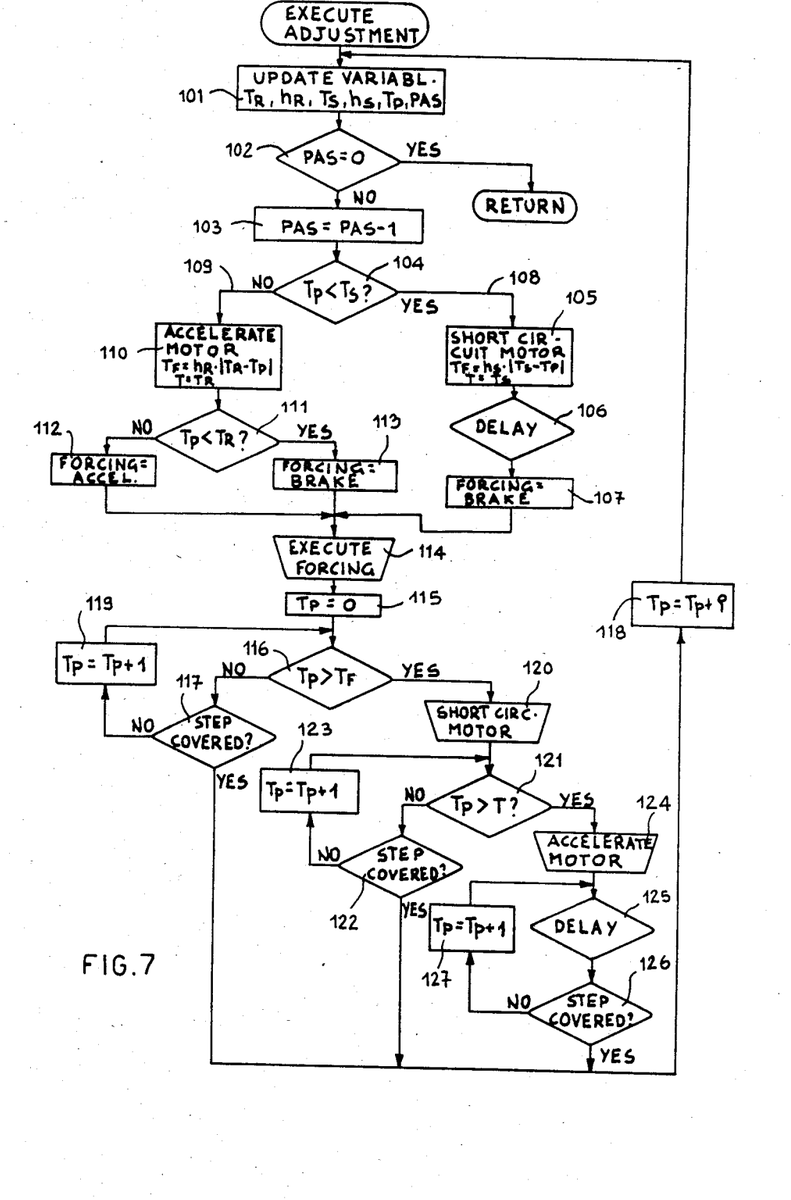
FIG. 7 is a second flowchart of the program of the microprocessor.

In a following subphase 102, the microprocessor 40 checks whether the number PAS of steps still to be completed, is equal to zero: in the affirmative case, this is the end of this adjustment phase and return to the main flow of FIG. 5 occurs, while in the negative case the value PAS is decremented by one unit in a subphase 103 and the microprocessor goes on to check in a subphase 104 whether the threshold time $T_S$ is greater than the actual time $T_p$ of covering of the proceding step, or than the fictitious time $T_{po}$, in the case of effecting the first step after starting off.

In the affirmative case, that is if the motor 29 is rotating too fast, the microprocessor 40 operates on the signals M1, M2, and M3 in a subphase to subphase 105 to put the motor immediately into a short-circuit condition, while there is carried out the calculation of the value of a forcing time $T_F$ which is equal to the product of the proportionality constant $h_S$ and the absolute difference between the values $T_S$ and $T_p$. A variable T is moreover defined which is set equal to the time $T_S$.

After a delay subphase 106 which is such as to cause the operations of the branch 108 to the right of the subphase 104 to last the same as the operations of the branch 109 to the left of the subphase 104, there is a subphase 107 in which it is established that the forcing of the motor will have to be a braking, or a reverse command.

If, on the other hand, it appears in the subphase 104 that the actual time $T_p$, or the fictitious time $T_{po}$, are greater than the threshold time $T_S$, the microprocessor 40, in a subphase 110, puts the motor 29 into the acceleration condition, while there is carried out the calculation of the time of the following forcing, $T_F$ which is equal to the product of the proportionality constant $h_R$ and the absolute difference between the values of $T_R$ and $T_p$. In this case, the variable T is set equal to the reference time $T_R$.

Then, in a subphase 111, there is a check whether $T_R$ is greater than $T_p$. In the affirmative case, a subphase 113 establishes that the following forcing will have to be a braking, while in the opposite case a subphase 112 establishes that this forcing will be an acceleration.

In the following subphase 114 there is the actual forcing of the motor 29 for the time $T_F$ calculated in the subphase 105 or in the subphase 110.

The time taken by the microprocessor 40 to execute the operations from the subphase 101 included to the subphase 114 excluded is indicated by Q.

At this point, after the time Q due to the calculation has elapsed from the beginning of the carrying out of the step, the microprocessor 40 executes a series of operations which, in addition to giving further commands to the motor 29 (30, 32), also serve for counting the time $T_p$ of actual covering of the step in progress or current step. Up to the phase 114, the time $T_p$ taken into consideration has been that taken to cover the preceding step but now the duration of the current step must be determined for utilization in the execution of the next step.

In a subphase 115, the value $T_p$ is put equal to zero and in a following subphase 116 the new time $T_p$ is compared with the forcing time $T_F$. So long as the new time $T_p$ remains less than or equal to the time $T_F$, the microprocessor 40 goes on to a subphase 117 to check whether the step has been covered, that is whether a predetermined leading edge of a logical signal STA or STB has been generated, as will also be seen in the course of the description of an example of operation. In the affirmative case, there is a return upstream of the subphase 101, via a subphase 118, which increments the time $T_p$ taken to cover the current step by the above-mentioned calculation time Q.

If the check in the subphase 117 is negative, there is a subphase 119 in which the time $T_p$ which is being calculated is incremented by one unit.

When it is found in the subphase 116 that the time $T_p$ is greater than the time $T_F$, the acceleration or braking ceases and there occurs a subphase 120 in which the motor 29 is short-circuited and a following subphase 121 in which the time $T_p$ is compared with the variable T, which as has been seen may be equal to $T_R$ or $T_S$. If $T_p$ is less than or equal to T, the microprocessor 40 goes on to a subphase 122 to check whether the step pa has been covered. In the affirmative case, there is a return upstream of the subphase 101, via the subphase 118, while in the negative case a subphase 123 occurs in which the time $T_p$ which is being calculated is incremented by another unit. If, on the other hand, it is found in the subphase 121 that the time $T_p$ is greater than T, there is a subphase 124 which puts the motor 29 into acceleration, and a following subphase 125 which serves solely to delay the check which a subphase 126 executes to establish whether the step pa has been covered. In the affirmative case, there is a return upstream of the subphase 101, via the subphase 118, while in the negative case there takes place a subphase 127 in which the time $T_p$ which is being calculated is incremented by another unit.

In the case when the length of the step pa varies between two successive adjustment segments, the microprocessor 40 provides for updating of the variable, including the value of $T_p$. If, for example, operation passes from a segment in which the step pa is equal to one increment to a segment in which the step is equal to half an increment, in addition to the updating of the variables $T_R$, $h_R$, $T_S$, $h_S$ and PAS, the time $T_p$ counted in the old segment is halved in value, before is used in decision 104 in the new segment.

After executing the adjustment of the last segment and, within the limits of this last segment also the adjustment of the last step, which yields PAS=0 in the subphase 102, the microprocessor 40 goes on to the logical phase 55 (FIG. 5), defined as the "position loop". In this phase, the microprocessor 40 controls the braking of the motor and brings into action the analog position loop on the analog signal FTA in the zone of monotony of the latter corresponding to the target.

Figure 8:
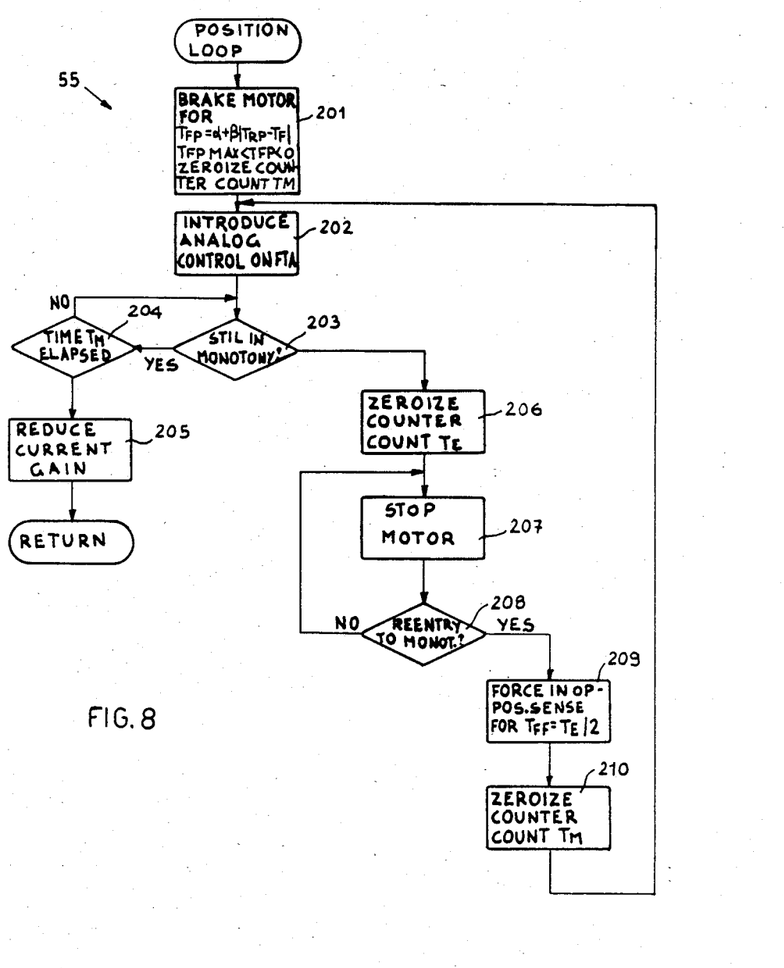
FIG. 8 is a third flowchart of the program of the microprocessor.

More particularly, the phase 55 comprises the phase 55 comprises the subphase 201 (FIG. 8) in which the microprocessor 40 firstly brakes the motor 29 by operating on the signals M1, M2 and M3, for a time $$T_{FP} = \alpha + \beta |T_{RP} - T_p|$$

in whch $\alpha$ and $\beta$ are constants depending on the characteristics of the motor which is being controlled and $T_{RP}$ is the time in which it is desired that the motor shall cover the last step.

The value of $T_{FP}$ is limited to predetermined maximum value $T_{FPmax}$ and comes to zero for a time $T_p = T_{pmin}$, which is also of predetermined value. Also in subphase 201, a counter inside the microprocessor is zeroized and counting of a time $T_M$ of predetermined value is started.

Then there is a subphase 202 in which analog control is introduced on the signal FTA. During this analog control, the microprocessor 40 goes on to a subphase 203 to check whether, through the generation of a predetermined edge of the signal STB, the signal FTA remains in the zone of monotony concerned. In the affirmative case, the microprocessor 40 passes to a subphase 204 in which it checks whether the predetermined time $T_M$ has elapsed and, if this is confirmed, passes to a further subphase 205, in which there is a reduction of the gain of current flowing in the motor which is being controlled, after which the microprocessor is ready to acquire a fresh datum (step 50 of FIG. 5).

If, on the other hand, in the subphase 203 it is found that the preestablished zone of monotony has been passed, the microprocessor 40 goes on to a subphase 206 in which it zeroizes its internal counter and counts a new time $T_E$, during which the motor will be forced into braking, that is sent into reverse.

This forcing is carried out in a subphase 207, after which there is a subphase 208 of checking for the reentry of the motor, and of the corresponding analog signal FTA, into the zone of monotony established before. As soon as this happens and is signalled by a suitable edge of the signal STB; the microprocessor 40 forces the motor in the opposite direction in a subphase 209 for a forcing time $T_{FF} = T_E/2$, on the expiry of which the counter inside the microprocessor 40 is rezeroized in a subphase 210 and the time $T_M$ is counted again. The analog position loop of the subphase 202 is then reintroduced.

After seeing what are the logical phases that the microprocessor 40 carries out for digitally controlling the motor 29, we will now see in detail how the logical signals M1, M2 and M3 (FIG. 3) which the microprocessor 40 generates are processed.

To each combination of the logical signals M1, M2 and M3 there corresponds a well-defined configuration of the motor 29 which it is desired to control, for example as illustrated in the following Table:

| M1 | M2 | M3 | State of Motor |
|----|----|----|----------------|
| 1  | 1  | 1  | Disabled |
| 0  | 1  | 1  | Short circuit |
| 0  | 0  | 1  | Forward command = acceleration |
| 1  | 0  | 1  | Reverse command = braking |
| 0  | 0  | 0  | Position loop on + FTA with current gain G = 1 |
| 1  | 0  | 0  | Position loop on − FTA with current gain G = 1 |
| 1  | 1  | 0  | Position loop on + FTA with current gain G < 1 |
| 0  | 1  | 0  | Position loop on − FTA with current gain G < 1 |

The signals M1, M2 and M3 are sent to the control circuit 41 (FIGS. 3, 9 and 10), which, also taking account of the analog signals SENS and FTA, supplies as output the signals PW1, PW2 and DREN for the actual command of the motor 29 and the signal STA which is sent to the microprocessor 40.

The signal SENS is derived from the driver circuit 42, which is of known type and comprises, for example, a double transistor bridge, (not shown in detail). A resistor $R_S$ for detecting the current $I_S$ is common to the two branches of the bridge.

Figure 9:
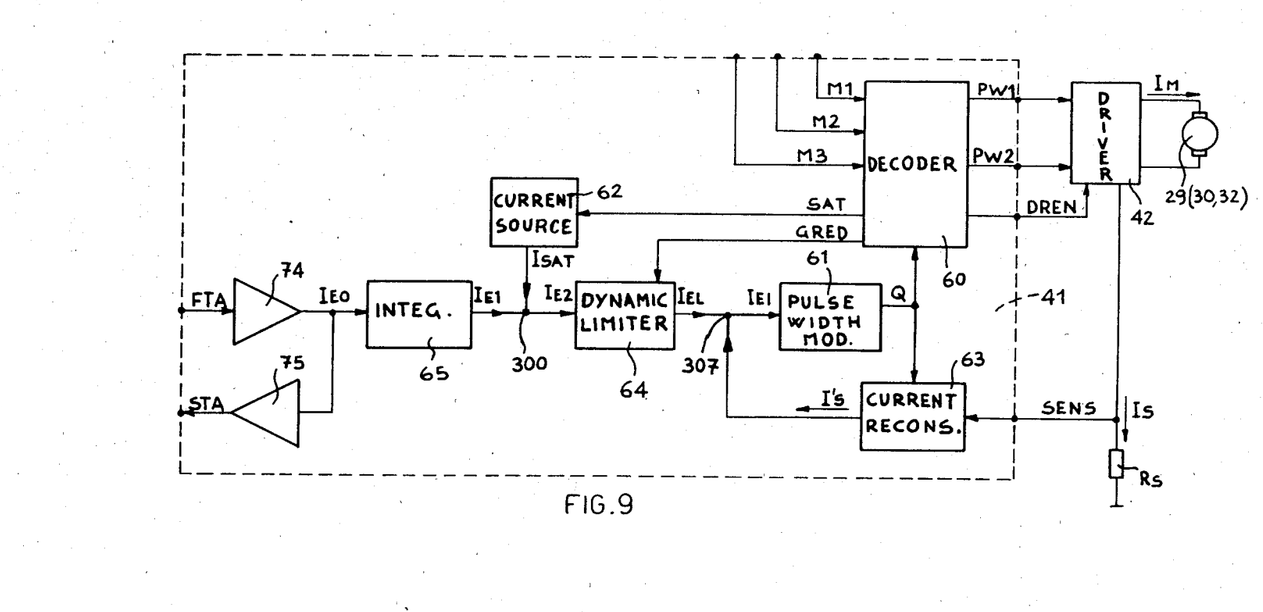
FIG. 9 is a block diagram of a detail of the arrangement embodying the invention.
Figure 10:
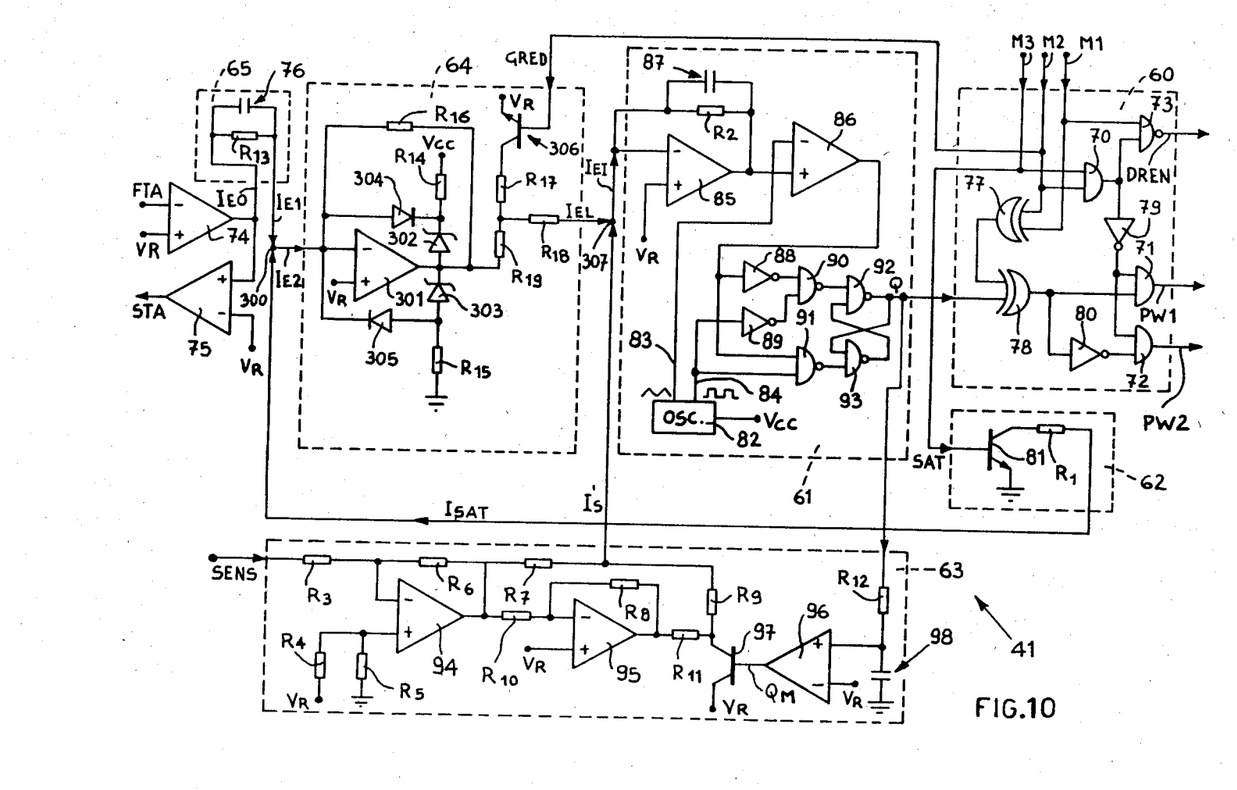
FIG. 10 is a circuit diagram of a detail of the arrangement embodying the invention.

More particularly, referring to FIGS. 9 and 10, where $V_R$ indicates a predetermined reference voltage and $V_{cc}$ indicates a predetermined d.c. voltage, the control circuit 41 comprises a decoder 60 which, by means of AND gates 70, 71 and 72, a NAND gate 73, two exclusive-OR gates 77 and 78 and two inverters 79 and 80, transforms the commands M1, M2 and M3 of the microprocessor 40 and a signal Q generated by a pulse width modulation 61 into the commands PW1, PW2 and DREN necessary for the driver circuit 42, a signal SAT=M3 which feeds a current source 62, and a signal GRED=M2 adapted to reduce the current gain in the motor 29, as will be described later on.

The truth table of the decoder 60 is as follows:

| M1 | M2 | M3 | PW1 | PW2 | DREN | SAT | GRED |
|----|----|----|-----|-----|------|-----|------|
| 1  | 1  | 1  | 0   | 0   | 0    | 1   | 1    |

-continued

| M1 | M2 | M3 | PW1 | PW2 | DREN | SAT | GRED |
|----|----|----|-----|-----|------|-----|------|
| 0  | 1  | 1  | Q   | 0   | 1    | 1   | 1    |
| 1  | 0  | 1  | Q   | Q   | 1    | 1   | 0    |
| 0  | 0  | 1  | Q   | Q   | 1    | 1   | 0    |
| 0  | 0  | 0  | Q   | Q   | 1    | 0   | 0    |
| 1  | 0  | 0  | Q   | Q   | 1    | 0   | 0    |
| 1  | 1  | 0  | Q   | Q   | 1    | 0   | 1    |
| 0  | 1  | 0  | Q   | Q   | 1    | 0   | 1    |

The current source 62 comprises a transistor 81 and a resistor $R_1$ and supplies as output a saturation current $I_{SAT}$. The modulator 61 comprises an oscillator 82 having a triangular-wave output 83 and a square-wave output 84, two operational amplifiers 85 and 86, a resistor $R_2$ and a capacitor 87 forming a feedback network for the amplifier 85, two inverters 88 and 89 and four NAND gates 90, 91, 92 and 93. The modualtor 61 generates the signal Q of square wave form at the frequency of the oscillator 82, with a duty cycle $\delta$ related to the incoming current $I_{EI}$ by the expression:

$$0.5 - \delta = K \cdot I_{EI} = K \cdot (I'_S + I_{EL})$$

in which K is a coefficient of proportionality.

When M3=SAT=1, $I_{SAT}$ is large and biases off a dynamic limiter 64 so that $I_{EL}=0$. This is the situation during digital control of the motor. When M3=SAT=0, $I_{EL}$ is derived from FTA and the "position loop" mode obtains.

The control circut 41 also comprises a so-called "current reconstructor" 63 which, by means of operational amplifiers 94, 95 and 96, a plurality of resistors $R_3-R_{12}$, a transistor 97 and a capacitor 98, reconstructs a current $I'_S$ proportional to the current $I_M$ which flows in the motor, and which indicates the torque of the motor, deriving it by coherent demodulation from the current $I_S$ which returns to earth from the driver 42 through the detecting resistor $R_S$. This demodulation is effected in dependence on the output Q of the modulator 61, so that for Q=1, the current $I'_S$ is proportional to $-I_S$, while Q=0 the same current $I'_S$ is proportional to $+I_S$.

Figure 14:
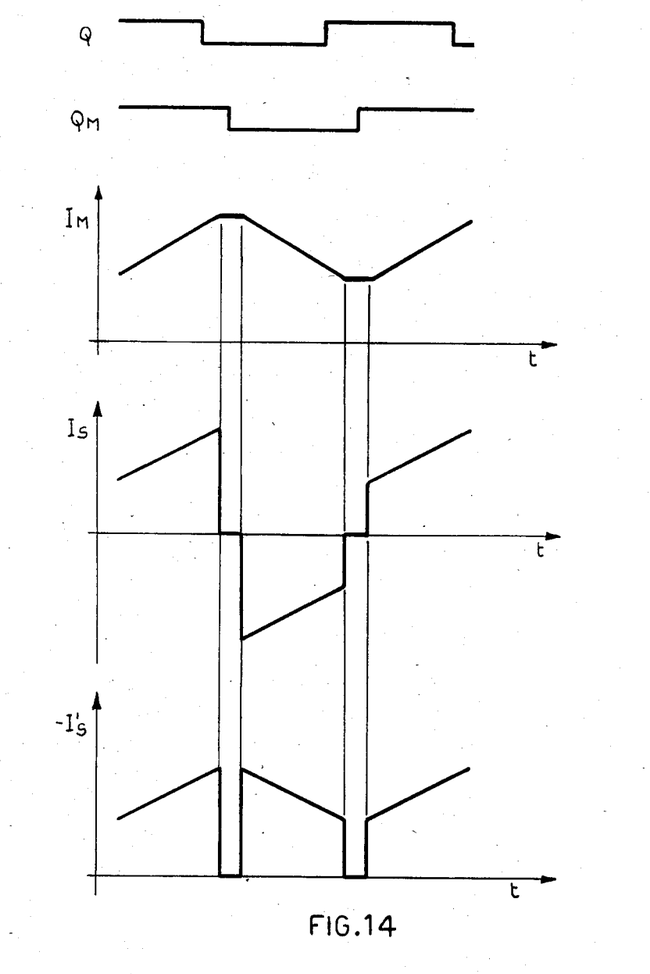
FIG. 14 is a diagram representing the course of other signals of the circuit of FIG. 9 and FIG. 10.

The waveforms of the signal Q from the modulator 61, the signal $Q_M$ leaving the amplifier 96, the current $I_M$ flowing in the motor, the bridge current $I_S$ and the current $I'_S$ are shown in FIG. 14.

The control circuit 41 moreover comprises an operational amplifier 74, which receives at one of its inputs the analog signal FTA and supplies at its output the signal $I_{E0}$, and an operational amplifier 75 which squares the signal FTA and generates the square signal STA.

The signal $I_{E0}$ is integrated by an integrator 65 comprising a resistor $R_{13}$ and a capacitor 76, thereby providing a signal $I_{E1}$. The latter is added at a node 300 to the signal $I_{SAT}$ from the current source 62 to form a signal $I_{E2}$ which enters the so-called "dynamic limiter" 64 which, by means of an operational amplifier 301, Zener diodes 302 and 303, diodes 304 and 305, resistors $R_{14}-R_{19}$ and a transistor 306, generates the signal $I_{EL}$.

In turn, the signal $I_{EL}$ is added at a node 307 to the signal $I'_S$ from the reconstructor 63 to form a signal $I_{EI}$ which, as has been seen, enters the modulator 61. The logical signal GRED from the decoder 60 goes to drive the base of the transistor 306.

Figure 13:
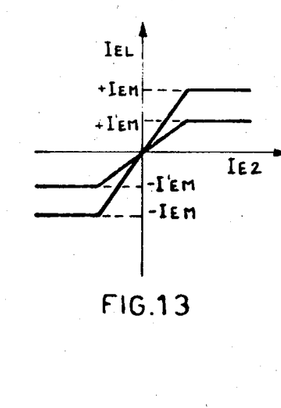
FIG. 13 is a diagram representing the course of some electric signals of the circuit of FIG. 10.

The function of the limiter 64 is to allow the input signal $I_{E2}$ to pass unchanged if it remains between two limits $+I_{EM}$ and $-I_{EM}$ (FIG. 13), otherwise it limits it to these values, if the signal GRED is at zero level. If, on the other hand, the signal GRED is at one level, the limits are $+I'_{EM}$ and $-I'_{EM}$. In this way, by operating on the signal GRED, it is possible to vary the current gain for the position loop.

Having seen the principle on which the microprocessor 40 generates the logical signal M1, M2 and M3 and how the control circuit 41 transforms these logical signals into signals of effective or actual command for the motor 29 (30, 32), an example of operation of the arrangement 20 according to the invention will now be described.

Let is be assumed that the motor 29 to be controlled is at a standstill and that, on the basis of the input data of the channel 49 (FIG. 3), it must carry out a rotation corresponding to six and a half increments. In the first phase 50 of the program (FIG. 5), N=6.5 is acquired and the direction of rotation is determined. The microprocessor 40 then goes on to the phase 51, where, on the basis of the programmed running table (FIG. 6), it establishes the value of the step and the reference time $T_R$ to be employed. In the example which is being illustrated, let it be assumed that to N=6.5 there corresponds a time $T_R=T_4$ and a step pa=1 increment. Moreover, in this phase, the microprocessor 40 establishes the values of $h_R$, $T_S$ and $h_S$.

For a better understanding of operation, let it also be assumed that the motor 29 and the corresponding transducer 35 are at a standstill in a position such that the analog signal FTA (FIGS. 4 and 11) is in its first zone of monotony $-$FTA, that is in the reference position $X_o$. The signal M2 is at one level and the signals M1 and M3 are at zero level: the motor is therefore in the state "position loop" on $-$FTA with current gain G<1.

Figure 11:
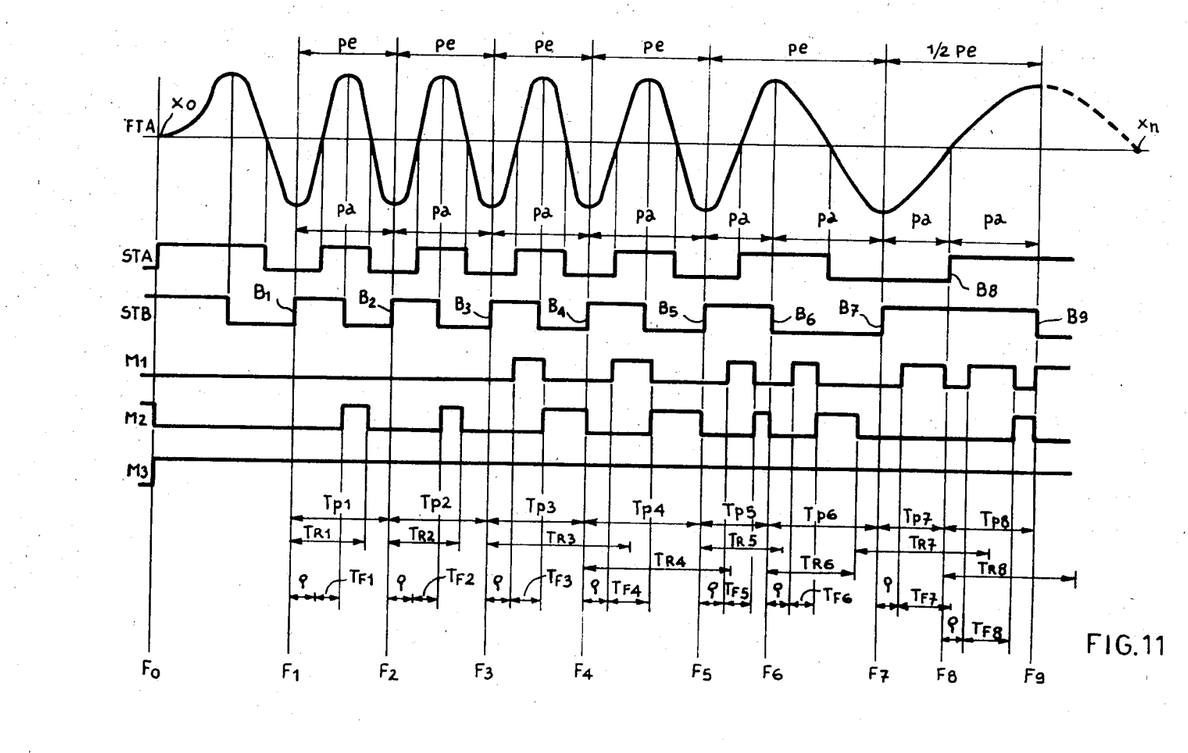
FIG. 11 is a diagram representing the course of a number of electric signals of an arrangement according to the invention detected during an example of operation.

At the instant $F_o$ (FIG. 11), passing from the phase 51 to the phase 52 of the program (FIG. 5), the microprocessor 40, bringing the signal M2 to zero level and the signal M3 to one level, effects the starting of the motor 29, giving it a forward command corresponding to an acceleration. This state is maintained up to the instant $F_1$, corresponding to the leading edge $B_1$ of the signal STB (FIG. 11).

From the instant $F_1$ there is counted the first reference time $T_{R1}=T_4$ and the first time $T_{p1}$ of covering the step pa. In this phase ($N_4 \leq N$), this step pa is still equal to one increment.

The microprocessor 40 maintains the signal M3 at one level and the signals M1 and M2 at zero level for the time Q necessary to the microprocessor for effecting its calculations (FIG. 7), thus continuing to accelerate the motor 29. The time Q having elapsed, the motor is still kept accelerated for a forcing time $F_{F1}=h_{R1} \cdot |T_{R1}-T_{po}|$, where $h_{R1}$ is the proportionality constant associated with the time $T_{R1}$ and $T_{po}$ is the predetermined fictitious time. In this case, the forcing corresponds to an acceleration since the fictitious time $T_{po}$ of covering of the preceding step is greater than the ideal time $T_{R1}$. After this, the signal M2 is brought to one level and the motor is short-circuited until the end of the time $T_{R1}$. At this point, the signal M2 returns to zero level and the motor accellerates again until the end of the step pa, corresponding to a new leading edge $B_2$ of the signal STB at the instant $F_2$.

The microprocessor 40 maintains the motor in the state of acceleration for a further time Q starting from the instant $F_2$, after which it forces the motor for a further forcing time $T_{F2}=h_{R2} \cdot |T_{R2}-T_{p1}|$, where $h_{R2}$ is the proportionality constant associated with $T_{R2}$, the latter is the reference or theoretical time relating to the step in progress or current step and $T_{p1}$ is the actual time taken to cover the preceding step. Since $T_{R2}$ is smaller than $T_{p1}$, during the forcing time the motor is accelerated, after which the signal M2 goes to one level and the motor is thus short-circuited until the end of the time $T_{R2}$ and then again accelerated up to a new leading edge $B_3$ of the signal STB. It is to be noted that for effecting this step, N still being less than or equal to $N_4$, the reference time $T_R$ is still equal to $T_4$. Therefore, $T_{R1}$ and $T_{R2}$ are equal, as are also the proportionality constants $h_{R1}$ and $h_{R2}$.

Figure 6:
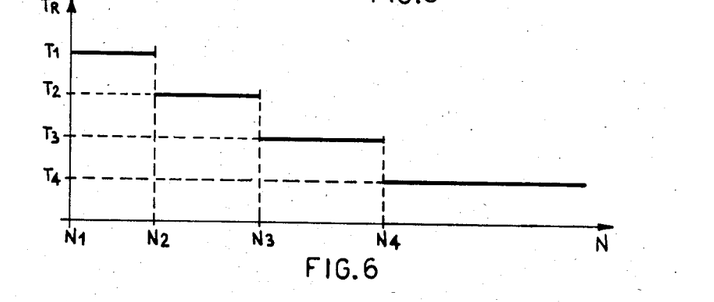
FIG. 6 is a diagram representing the reference times ($T_R$) employed by the microprocessor of FIG. 3 in relation to the number (N) of strobes from the target.

The microprocessor 40, which after each step covered updates the calculation parameters on the basis of the running table of FIG. 6, now detects that N is between $N_3$ and $N_4$, because of which the reference time $T_R$ is set equal to $T_3$, while the step pa remains equal to the period pe of the signal FTA.

From the instant $F_3$, in correspondence with the leading edge $B_3$ of the signal STB, there are counted the time $T_{R3}=T_3$, the step covering time $T_{p3}$ and the time Q, during which the motor is kept accelerated, while the microprocessor 40 performs the comparison between $T_{R3}$ and $T_{p2}$ and calculates the forcing time $T_{F3}=h_{R3} \cdot |T_{R3}-T_{p2}|$, where $H_{R3}$ is the proportionality constant associated with the time $T_{R3}$.

Since in this phase the theoretical time $T_{R3}$ is greater than the time $T_{p2}$ of covering of the preceding step, the motor 29 (30, 32) is braked for the whole of the time $T_{F3}$, bringing the signal M1 to one level, after which it is short-circuited until the end of the step, that is up to a new leading edge $B_4$ of the signal STB, bringing the signal M1 back to zero level and the signal M2 to one level.

As is the case after each step, the microprocessor 40 provides for the updating of the variables; in this instance, however, N still being between $N_3$ and $N_4$, both $T_R$ and pa remain equal to the values of the preceding step.

From the instant $F_4$ corresponding to the edge $B_4$ of the signal STB, the microprocessor 40 counts the time $T_{R4}=T_3$, the covering time $T_{p4}$ and the time Q, during which the motor is kept accelerated, while the comparison is executed between $T_{R4}$ and $T_{p3}$ and the forcing time $T_{F4}=h_{R4} \cdot |T_{R4}-T_{p3}|$ is calculated, where $h_{R4}$ is the proportionality constant associated with $T_{R4}$. The theoretical time $T_{R4}$ being also greater in this phase than the time $T_{p3}$ of covering of the preceding step, the motor 29 (30, 32) is braked for the whole of the time $T_{F4}$, after which it is short-circuited until the end of the step, that is up to a new leading edge $B_5$ of the signal STB.

N now being between $N_2$ and $N_3$ the microprocessor 40 provides for the updating of the variables on the basis of the running table of FIG. 6, and in particular there is obtained $T_R=T_2$ and pa=$\frac{1}{2}$pe.

From the instant $F_5$, corresponding to the edge $B_5$ of the signal STB, the microprocessor 40 counts the time $T_{R5}=T_2$, the actual covering time $T_{p5}$ and the time Q, during which the motor 29 (30, 32) is accelerated, while the comparison is made between $T_{R5}$ and one half of the time $T_{p4}$ and there is calculated the forcing time $T_{F5}=h_{R5} \cdot |T_{R5}-T_{p4}/2|$, where $h_{R5}$ is the proportionality constant associated with the time $T_{R5}$. The theoretical time $T_{R5}$ in this phase being greater than one half of the time $T_{p4}$ of covering of the preceding step, the motor 29(30, 32) is braked for the time $T_{F5}$ and the short-circuited until the end of the step, that it up to the trailing edge $B_6$ of the signal STB. The trailing edge is taken because in this phase pa=$\frac{1}{2}$pe; for the same reason, the covering time $T_{p4}$, which on the other hand refers to the time of a whole period, is halved in the calculation of the forcing time $T_{F5}$ and in the comparison with the theoretical time $T_{R5}$.

In this phase, the speed of the motor is lower, since the target is being approached. This also becomes obvious from the variation in the period pe of the analog signal FTA supplied by the transducer 35 associated with the motor 29.

In this phase, N being still between $N_2$ and $N_3$, the microprocessor 40 does not modify the variables.

From the instant $F_6$, corresponding to the edge $B_6$ of the signal STB, there are computed the theoretical time $T_{R6}=T_2$ of covering of the current step, the time $T_{p6}$ of actual covering of the current step and the time Q, during which the microprocessor 40, while it provides for accelerating the motor 29 (30, 32), executes the comparison between $T_{R6}$ and $T_{p5}$ and calculates the forcing time $T_{F6}=h_{R6} \cdot |T_{R6}-T_{p5}|$, where $h_{R6}$ is the proportionality constant associated with the time $T_{R6}$. The theoretical time $T_{R6}$ in this phase being also greater than the actual time $T_{p5}$, the motor 29 is braked for the whole of the time $T_{F6}$, after which it is short-circuited until the end of the time $T_{R6}$ and then accelerated up to a new edge $B_7$ of the signal STB. At this point, the microprocessor 40 detects that N is now between $N_1$ and $N_2$ and provides for the updating of the variables on the basis of the running table. In particular, there is obtained $T_R=T_1$ and pa=$\frac{1}{4}$pe.

Figure 12:
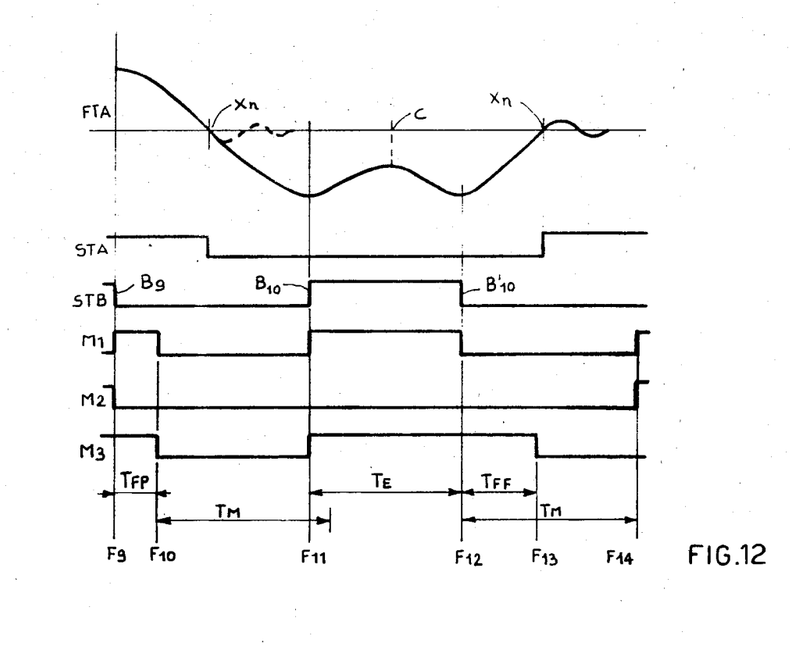
FIG. 12 is a further diagram representing the signals of FIG. 11 in a following stage, during an example of operation of the arrangement.

From the instant $F_7$, corresponding to the edge $B_7$ of the signal STB, there are counted the theoretical time $T_{R7}=T_1$ of covering of the current step, the time $T_{p7}$ of actual covering of the current step and the time Q, during which the motor 29 (30, 32) is accelerated, while the microprocessor 40 executes the comparison between the time $T_{R7}$ and one half of the time $T_{p6}$ and there is calculated the forcing time $T_{F7}=h_{R7} \cdot |T_{R7}-T_{p6}/2|$, where $h_{R7}$ is the proportionality constant associated with the time $T_{R7}$. $T_{R7}$ being greater than one half of $T_{p6}$, the motor 29 is braked, but in this case not for the whole of the time $T_{F7}$, but up to the instant $F_8$, in which there is a leading edge $B_8$ of the signal STA. This is because in this phase, as has been seen, the step pa is one quarter of the period pe; it is for the same reason that the time $T_{p6}$ which relates to the time of covering of the preceding half period is halved in the comparison with the theoretical time $T_{R7}$ of covering of a quarter period. At the instant $F_8$, N being still between $N_1$ and $N_2$, the microprocessor 40 does not modify the variables. From this instant there are computed the theoretical time $T_{R8}=T_1$, the actual time $T_{p8}$ and the time Q, during which the motor 29 (30, 32) is accelerated, while the microprocessor 40 effects the comparison between the time $T_{R8}$ and the time $T_{p7}$ and calculates the forcing time $T_{F8}=h_{R8} \cdot |T_{R8}-T_{p7}|$. $T_{R8}$ being greater than $T_{p7}$, the motor 29 (30, 32) is braked for the whole of the time $T_{F8}$, after which it is short-circuited until the end of the step, that is up to a new edge $B_9$ of the signal STB at the instant $F_9$. At this instant, the microprocessor 40 detects that the motor 29 is about to complete its rotation, the corresponding analog signal FTA having arrived in the zone of monotony corresponding to the position $X_n$ to be reached (FIG. 12).

At the instant $F_9$, the microprocessor 40 imparts to the motor 29 a forcing into braking for a time $T_{FP}=\alpha+\beta|T_{R8}-T_{p8}|$, as has been seen hereinbefore, unless $T_{FP}$ is less than zero, in which case this forcing is not carried out, and, at the instant $F_{10}$, engages the analog "position loop" on the zone +FTA with current gain G=1, bringing the three logical signals M1, M2 and M3 to zero.

In this state, the current source 62 (FIG. 10) is disabled, the signal SAT being at zero level, and at the sum node 307 there arrives the limited error signal $I_{EL}$ proportional to the signal $I_{E0}$, which in turn indicates the position error of the motor with respect to the point of arrest $X_n$.

The closed loop formed by the modulator 61 (FIG. 9), the decoder 60, the driver 42, the motor 29, the resistor $R_S$ and the reconstructor 63 imposes on the motor a current $I_M$ proportional to the signal $I_{EL}$. In this way, the motor 29 reacts with a torque which tends to bring it into the position of stable equilibrium.

As has been seen hereinbefore during the description of the phase 55 of FIG. 5, if after a time $T_M$ the microprocessor 40 does not receive any signalling of traversing of the zone of monotony corresponding to the target to be reached, which signalling is obtained by means of the signal STB, the microprocessor readies itself to acquire another datum. This situation is represented by the signal FTA shown by dashes in FIG. 12.

If, on the other hand, there occurs the signalling, given by the leading edge $B_{10}$ of the signal STB, of the passing of the zone of monotony corresponding to the position to be reached $X_n$, the microprocessor 40 still forces the motor 29 into braking, in a manner similar to that seen for the other steps, for a time $T_E$, which is the time of stay of the motor 29 (30, 32) in the outside region of the zone of monotony considered and comprised between the edges $B_{10}$ and $B'_{10}$ of the same signal STB. It is pointed out that, although the edges $B_{10}$ and $B'_{10}$ are generated at instants $F_{11}$ and $F_{12}$ different from one another, there corresponds to these edges the same angular position of the motor, the latter having reversed its direction of rotation in the position C inasmuch as the forcing into braking, which is nothing other than a reversing command, has been such as to cause it to reverse its rotation.

From the instant $F_{12}$, the motor 29 is still forced for a time $T_{FF}$ equal to one half of $T_E$, causing it in this way to stop, after very brief oscillations, at the point $X_n$.

Observing the signals M1 and M2, it can be seen how the motor is accelerated from the instant $F_{10}$. However, the motor having reversed its rotation at the point C explains how it comes to be braked towards the position $X_n$.

The time $T_{FF}$ having elapsed, at the instant $F_{13}$ the motor is put by the microprocessor in the state "position loop" on −FTA with current gain G=1, with the three signals M1, M2 and M3 at zero level.

The time $T_M$ having elapsed from reentry into the zone of monotony corresponding to the position $X_n$, that is from the instant $F_{12}$, the microprocessor 40, not having another signal of passing of this zone of monotony, brings the signals M1 and M2 to one level, putting the motor 29 into the state: position loop on +FTA, with current gain G<1, and prepares to acquire a fresh datum.

It is therefore clear that the arrangement 20 according to the invention comprises means 35 (36, 37) for generating electric signals FTA, STA and STB indicating the angular position of the motor 29 (30, 32) and the actual time $T_p$ of covering a predetermined unitary angular distance pa, an electric control circuit 41 adapted to condition the motor 29 (30, 32) to short-circuit it, brake it or accelerate it, and a microprocessor 40 connected to the circuit 41 and to the signal generator 35 (36, 37), and that in the microprocessor 40 there are stored the theoretical times $T_R$ for covering each unitary distance pa as a function of the full amplitude of the rotation that the motor must effect, and that the microprocessor 40 is adapted to compare the actual times $T_p$ with the theoretical times $T_R$ for covering each unitary distance pa to determine in what state the circuit 41 must keep the motor 29 (30, 32) and the time of duration of each state.

It will be appreciated that the various references to storing quantities in the microprocessor include the possibility of storage in memory external to the processor chip itself. The running table for example may be stored in internal or external ROM.

We claim:

1. An arrangement for controlling the speed and the position of a direct-current electric motor connected to a rotatable part of an office machine, comprising:
encoder means associated with said motor for generating feed-back signals indicative of the angular position of said motor and of the actual time ($T_p$) elapsed for covering a predetermined angular step (pa);
an electric control circuit connected to said motor for selectively shortcircuiting, accelerating and braking said motor; and
a microprocessor connected to said electric control circuit and to said encoder means, said microprocessor comprising memory means for storing the theoretical times ($T_R$) necessary for covering each angular step (pa) as a function of the full amplitude of the rotation of said motor from an actual position to a desired position, and comparator means for comparing for each angular step (pa) said actual time ($T_p$) with the corresponding theoretical time ($T_R$) and consequently generating logical signals which cause said electric control circuit to short-circuit, to accelerate or to brake said electric motor.

2. An arrangement according to claim 1, wherein a first of said feed-back signals is of analog and sinusoidal type, and wherein stop means are provided in said electric control circuit for stopping the rotation of said motor in stop positions corresponding to zero values of said first feed-back signal.

3. An arrangement according to claim 2, wherein said first feed-back signal comprises a plurality of monotony zones crossing the zero value, wherein said microprocessor further comprises means for detecting the beginning of a determined monotony zone of said first feed-back signal corresponding to a stop position of said motor, and wherein said electric control circuit further comprises means for directly utilizing said determined monotony zone of said first feed-back signal for controlling said motor.

4. An arrangement according to claim 3, wherein the zero value of said determined monotony one of said first feed-back signal corresponds to the stop position of said motor, and wherein said microprocessor further comprises means for detecting the overpassing of said determined monotony zone and means for causing said electric control circuit to force back said motor towards said stop position of said determined monotony zone.

5. An arrangement according to claim 4, wherein said microprocessor further comprises means for detecting the reentry of said first feed-back signal into said determined monotony zone, means for counting the time ($T_E$) elapsing between the overpassing of said determined monotony zone and the reentry into said determined monotony zone and means for causing said electric control circuit to brake said motor for a time ($T_{FF}$) equal to one half of said elapsing time ($T_E$).

6. An arrangement according to claim 1, wherein the duration of said logical signals is proportional to the absolute difference ($|T_R - T_p|$) between the theoretical time ($T_R$) and the actual time ($T_p$) of covering each one of said angular steps.

7. An arrangement according to claim 1, wherein said electric control circuit is conditioned by said logical signals generated by said microprocessor to command said motor into acceleration when said comparator means has determined that said actual time ($T_p$) is greater than said theoretical time ($T_R$) of covering an angular step (pa) and to command said motor into braking when said comparator means has determined that said actual time ($T_p$) is less than said theoretical time ($T_R$) of covering an angular step (pa).

8. An arrangement according to claim 1, wherein in said memory means there are stored also a plurality of threshold times ($T_S$) for covering each angular step (pa) as a function of said full amplitude, and wherein said microprocessor further comprises checking means for checking whether said actual time ($T_p$) is lower than the corresponding threshold time ($T_S$) and consequently causing said electric control circuit to brake said motor.

9. An arrangement according to claim 8, wherein said checking means effects said checking before said comparator means effects the comparison between said actual time ($T_p$) and said theoretical time ($T_R$) and wherein said comparison is not effected in the affirmative case of said checking.

10. An arrangement according to claim 1, wherein said comparator means effects comparison between the theoretical time ($T_R$) of covering each angular step (pa) and the actual time ($T_p$) of covering of the preceding angular step.

11. An arrangement according to claim 10, wherein in said memory means there is also stored a fictitious actual time ($T_{PO}$), and wherein during the rotation of the first of the angular steps, the theoretical time ($T_R$) of covering said first angular step is compared with said fictitious actual time ($T_{PO}$).

12. An arrangement according to claim 2, wherein said angular step (pa) is directly proportional to the period (pe) of said first feed-back signal, and wherein said microprocessor further comprises means for determing the ratio of proportionality between said period (pe) and said angular step (pa) as a function of said full amplitude of the rotation of said motor.

13. An arrangement according to claim 2, wherein said electric control circuit comprises a pulse-width modulator for generating a modulated signal which is a function of the current ($I_M$) flowing in said motor and of the value of said first feedback signal, and a decoder which is directly connected to said microprocessor and to said pulse width modulator.

14. An arrangement according to claim 13, wherein said electric control circuit further comprises a variable gain current limiting circuit which is interposed between said encoder means and said pulse-width modulator, and wherein the gain of said current limiting circuit is determined by said microprocessor.

15. An arrangement according to claim 1, wherein a driver circuit is interposed between said electric control circuit and said motor, and wherein a single resistor is connected to said driver circuit for detecting a current ($I_S$) proportional to the current ($I_M$) flowing in said motor and for supplying a corresponding sensing signal to said electric control circuit.

* * * * *